No. 849,520.  
PATENTED APR. 9, 1907.
J. B. WENER.  
WAGON SHAFT SUPPORT.  
APPLICATION FILED OCT. 12, 1906.
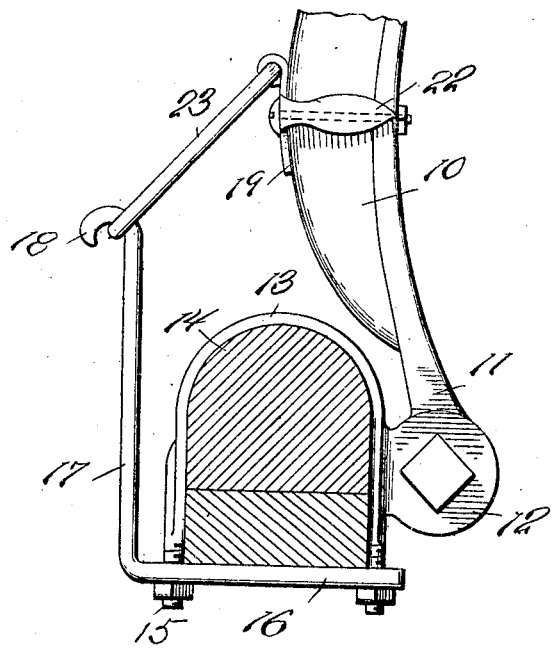
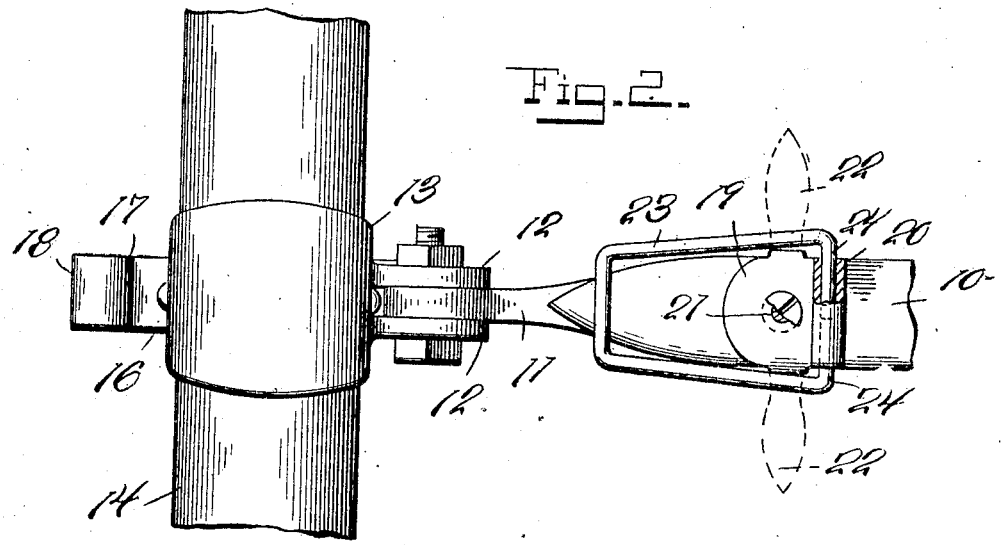

UNITED STATES PATENT OFFICE.

JOHN B. WENER, OF LOS ANGELES, CALIFORNIA.

WAGON-SHAFT SUPPORT.

No. 849,520. Specification of Letters Patent. Patented April 9, 1907.

Application filed October 12, 1906. Serial No. 338,668.

*To all whom it may concern:*

Be it known that I, JOHN B. WENER, a citizen of the United States, residing at Los Angeles, in the county of Los Angeles, State of California, have invented certain new and useful Improvements in Wagon-Shaft Supports; and I do hereby declare the following to be a full, clear, and exact description of the invention, such as will enable others skilled in the art to which it appertains to make and use the same.

This invention has relation to means for supporting the shafts of a vehicle in elevated position when the vehicle is not in use.

It is the object of the invention to provide improvements in the means connected with the thills or shafts whereby they may be folded down and be out of the way when the vehicle is not in use.

The nature of the invention is clearly portrayed in the annexed drawings, forming a part of this specification, in view of which it will first be described with respect to its construction and mode of operation and then be pointed out in the subjoined claim.

Of the said drawings, Figure 1 is a side elevation of the hook and the means through which it is attached. Fig. 2 is a plan of the link for engaging the hook, the means to which it is hinged or pivoted, and the means for connecting the latter with the shaft.

Similar figures of reference designate similar parts or features, as the case may be, wherever they occur.

In the drawings, 10 designates the shaft or thill, 11 the thill-iron secured to the shaft and bolted between the ears 12 of the clip 13, encompassing the top and sides of the axle 14. The lower projecting ends 15 of the clip 13 are connected by a yoke 16, having perforations through which the ends 15 extend and on which nuts are turned to secure the clip tightly in place. Extending up vertically from the inner end of the yoke and forming an integral part thereof is a bar 17, provided on its upper end, which is above the plane of the axle, with a hook 18.

19 designates a plate of suitable metal having its upper end bent to form a knuckle 20 and a hole 21 made centrally through it. From the sides of the plate 19 there extend lateral arms 22 of suitable length and form.

23 designates a link formed from a length of wire and having its ends 24 bent inward on right lines toward each other and engaged with the knuckle 20 to hinge the link to the knuckle. The plate, with the link hinged thereon, is applied to the top of the thill by bolting it thereon in the rear of the swingletree, (not shown,) the bolt passing through the hole 21 and through a hole made through the thill, and it may be the thill-iron. The lateral arms 22 are then bent around the opposite sides of and under the thill and held in place by friction and their non-resilient properties.

In operation when the vehicle is in use the link 23 will be lapped back and lie on the plate 19 and top of the thill, out of the way, and when the vehicle is out of use the shafts or thills will be raised and the link will be raised and engaged with the hook 18 on the top of the bar 17, holding the shafts up out of the way and keeping them from warping. The link may be disengaged from the hook in an obvious manner to lower the shafts.

The manner of connecting the link with the shaft is an important feature of the invention.

What is claimed is—

The combination, with a vehicle-shaft, of a plate provided with lateral arms and a centrally-located hole, a bolt passed through said hole and through the shaft and secured thereto, and the lateral arms being bent around the opposite sides of the shaft and under the same, and the plate being also provided on its upper edge with a knuckle, a link formed from a length of wire and having its ends bent inward in a right line and secured in said knuckle, the axle to which the shaft is secured, and a bar extending up in the rear of the axle and terminating in a hook with which the link may be engaged.

In testimony whereof I affix my signature in presence of two witnesses.

JOHN B. WENER.

Witnesses:
WALTER ROSE,
CATHERINE KERLEY.